March 16, 1926.
C. H. DE FREHN
1,576,902
CURTAIN FRAME
Filed July 3, 1922
2 Sheets-Sheet 1
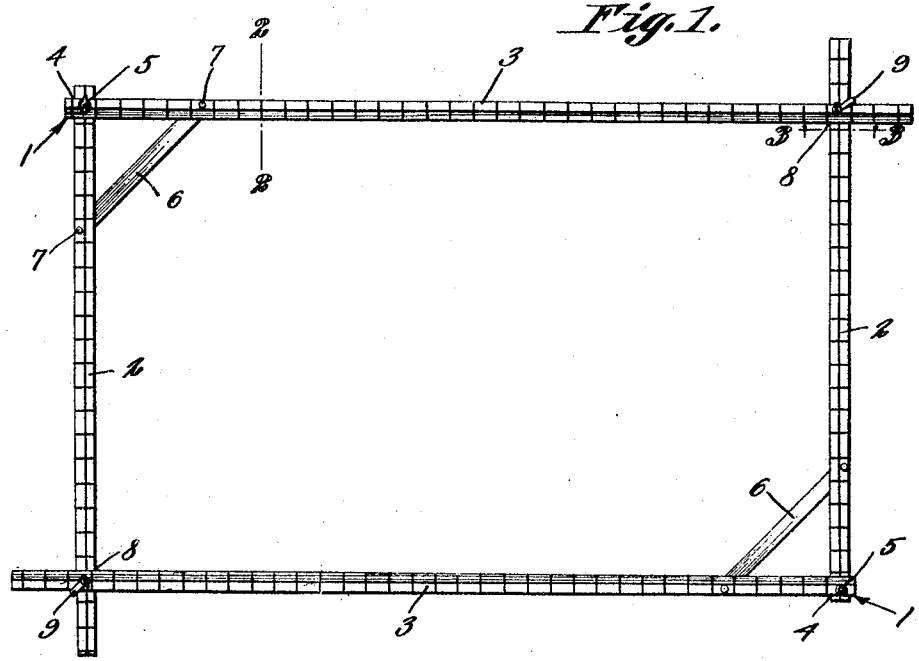
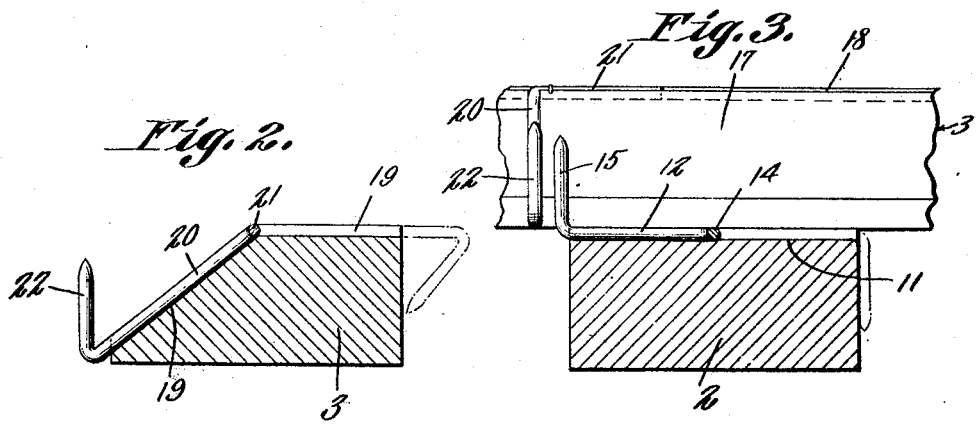
C. H. DeFrehn,
Inventor.
By C. A. Snow & Co.
Attorneys March 16, 1926.
C. H. DE FREHN
CURTAIN FRAME
Filed July 3, 1922   2 Sheets-Sheet 2
1,576,902
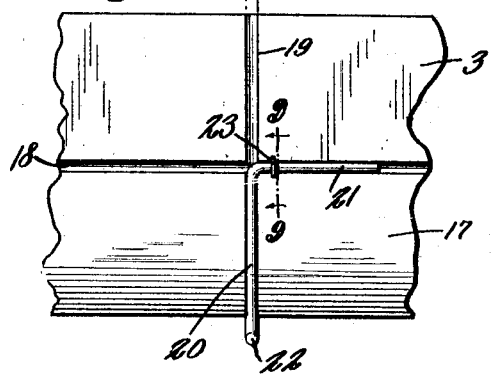
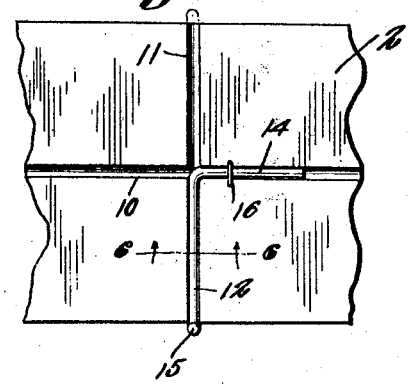
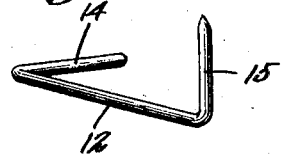
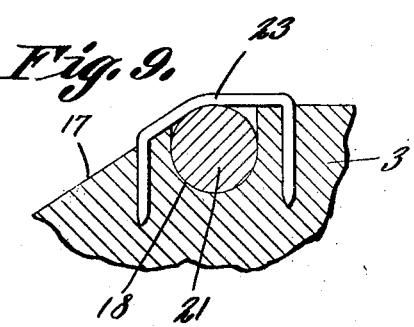
C. H. De Frehn,
Inventor.
By C. A. Snow & Co.
Attorneys Patented Mar. 16, 1926.

1,576,902

UNITED STATES PATENT OFFICE.

CHARLES H. DE FREHN, OF JOHNSTOWN, PENNSYLVANIA.

CURTAIN FRAME.

Application filed July 3, 1922. Serial No. 572,444.

*To all whom it may concern:*

Be it known that I, CHARLES H. DE FREHN, a citizen of the United States, residing at Johnstown, in the county of Cambria and State of Pennsylvania, have invented a new and useful Curtain Frame, of which the following is a specification.

The device forming the subject matter of this application is a frame of the sort used for stretching curtains and other articles, and one object of the invention is so to mount the curtain holding hooks on the frame that the hooks may be turned over into an out-of-the-way position when not in use, thereby preventing the hooks from becoming bent, and permitting an adjustment of the constituent bars of the frame, the hooks being so located, on the bars of the frame, that the hooks on the respective bars will be disposed at practically a common level, thereby preventing the curtain from becoming detached from the hooks at the corners of the frame.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in plan, a device constructed in accordance with the invention; Figure 2 is a cross section taken strictly on the line 2—2 of Figure 1; Figure 3 is a section on the line 3—3 of Figure 1; and Figure 4 is a plan showing one of the bars; Figure 5 is a plan showing the other of the bars; Figure 6 is a section on the line 6—6 of Figure 5; Figure 7 is a perspective showing one of the hooks; Figure 8 is a perspective showing another of the hooks; Figure 9 is a section on the line 9—9 of Figure 4.

The frame may be constructed in various ways, but, if desired, it may comprise two L-shaped parts 1 each including a bar 2 and a bar 3 disposed at an angle to the bar 2, the bar 3 preferably being located above the bar 2, the bars 2 and 3 being crossed on each other as shown at 4, and being connected, at their point of crossing, releasably, in any suitable way, for instance, by means of a thumb screw 5. Diagonal braces 6 are connected by pivot elements 7 to the bars 2 and 3. Obviously, the bars 2 and 3 may be folded into parallelism, to accommodate space, when the device is not in use. The bar 2 of each part 1 is crossed at 8 on the bar 3 of the other part 1, the bars 2 and 3 of the respective parts 1 being held together at their point of crossing, releasably, by means of clamps 9 or any other suitable way.

On its upper surface, the bar 2 has a longitudinal groove 10. In the upper surface of the bar 2, transverse grooves 11 are fashioned, the grooves 11 extending across the upper surface of the bar 2 from one edge thereof to the other.

Hooks are provided, one of the hooks being shown in detail in Figure 8. Each hook comprises a body 12 and an arm 14 at right angles to the body, the body 12 carrying an upstanding prong 15 located at right angles to the body 12 and at right angles to the plane defined by the body 12 and the arm 14. The arm 14 of the hook is mounted to rock in the longitudinal groove 10 and is held therein by a bearing 16 of any desired kind, such as a staple. The body 12 extends transversely of the bar 2 and is adapted to be received in the transverse groove 11. The bar 3 has a downwardly and inwardly sloping surface 17, the said bar being supplied on its upper surface with a longitudinal groove 18, and being provided on its upper surface with transverse grooves 19 extended across the bar from one edge thereof to the other.

A plurality of hooks are provided, each hook including, as shown in Figure 7, a body 20 and an arm 21 projecting from the body at right angles thereto, the body being supplied with a prong 22. The prong 22 is located at an acute angle to the body 20 and is disposed at an acute angle to the plane defined by the body 20 and the arm 21. The arm 21 is mounted to rock in the longitudinal groove 18 and is held therein by a bearing 23 of any desired kind, such as a staple.

In practical operation, when the device is set up for use, as shown in Figure 1, the hooks on the bar 2 project inwardly, the body 12 of each hook being received in the inner portion of the transverse groove 11, and the prong 15 upstanding from the bar 2, as shown in Figure 3. Likewise, the body 20 of the hook on the bar 3 is received in that portion of the transverse groove 19 which extends downwardly along the sloping surface 17 of the bar 3, the prong 22 upstanding, as shown in Figures 2 and 3. It is not absolutely necessary that the bar 3 be beveled off as shown at 17, it is desirable to bevel the bar as aforesaid, because, owing to this construction, the prongs 22 and 15 are disposed at the same level, the curtain always remaining engaged with the prongs at the corners of the frame.

When the occasion for the use of the device has passed, the hooks on the bar 2 may be turned outwardly into the dotted line position of Figure 3, the body 12 of each hook being received in the outer portion of the transverse groove 11, the arm 14 rocking in the longitudinal groove 10, and the prong 15 extending downwardly along one edge of the bar 2. The prong, thus, is disposed in an out-of-the-way position and is not likely to be bent. The hooks on the bar may be turned over into an out-of-the-way position, in a similar way as delineated in Figure 2. Owing to the fact that the hooks on the bar 2 may be disposed in the position shown in dotted line in Figure 3, the bar 3 may be adjusted transversely of its length, and longitudinally of the bar 2, without striking the hooks on the bar 2.

I claim:—

A device of the class described comprising a bar having transverse grooves and provided with a longitudinal groove intersecting the transverse grooves, a plurality of hooks each comprising a body, an arm projecting from one end of the body, and a prong projecting from the other end of the body at an angle to the plane defined by the arm and the body, the arms of the hooks being mounted to rock in the longitudinal groove, and the transverse grooves being adapted to receive the bodies of the hooks, and separate means carried by the bar and overhanging the arm of each hook to hold the arm for rocking movement in the longitudinal groove.

In testimony that I claim the foregoing as my own, I have hereto affixed my signature.

CHARLES H. DE FREHN.